UNITED STATES PATENT OFFICE.

JAMES H. STEBBINS, JR., OF NEW YORK, N. Y.

COLORING-MATTER OR DYE-STUFF.

SPECIFICATION forming part of Letters Patent No. 266,912, dated October 31, 1882.

Application filed December 23, 1881. (Specimens.)

*To all whom it may concern:*

Be it known that I, JAMES H. STEBBINS, Jr., a citizen of the United States, residing at New York, in the county and State of New York, have invented new and useful Improvements in Dye-Stuffs or Coloring-Matters, of which the following is a specification.

This invention relates to a green dye-stuff produced by the action of benzoyl chloride upon a mixture of methyldiphenylamine and zinc chloride at a temperature of about 100° centigrade.

In carrying out my invention I take ten pounds of benzoyl chloride, twenty pounds of methyldiphenylamine, and fifteen pounds of zinc chloride, and heat the mixture on the steam bath till the odor of benzoyl chloride has disappeared and the mixture has assumed the consistency of a thick black paste, which on cooling solidifies. This is then washed several times with cold water, and then treated with a current of steam, which drives off the excess of methyldiphenylamine. The compound so obtained may then be dissolved with fuming sulphuric acid at a temperature of 100° to 110° centigrade, and thereby converted into its sulpho-acid or salt thereof, which is easily soluble in water. This sulpho compound, however, I do not claim in this present application for a patent. The basic compound dissolves readily in alcohol with a fine green color. It is insoluble in hot and cold water. Strong sulphuric acid dissolves it with an orange-red color, which is again changed to green by the addition of water.

If the alcoholic solution of this dye is treated with potash, the colorless base is thrown down, which, however, can immediately be converted into a salt again by the addition of a strong acid.

I do not limit myself to the proportions herein described, as they may be changed without departing from the principle of my invention.

What I claim as new, and desire to secure by Letters Patent, is—

The green dye-stuff produced by the action of benzoyl chloride upon methyldiphenylamine in the presence of zinc chloride, substantially as herein set forth.

In testimony whereof I have hereunto set my hand and seal in the presence of two subscribing witnesses.

JAMES H. STEBBINS, JR. [L. S.]

Witnesses:
W. HAUFF,
E. F. KASTENHUBER.